United States Patent
Lee et al.

(10) Patent No.: US 7,568,024 B2
(45) Date of Patent: Jul. 28, 2009

(54) METHOD FOR DECIDING NETWORK MANAGER IN HOME NETWORK

(75) Inventors: Kyoung-Woo Lee, Seoul (KR); Seung-Cheon Kim, Anyang (KR); Sang-Wook Lim, Gunpo (KR)

(73) Assignee: LG Electronics Inc., Seoul (KR)

( * ) Notice: Subject to any disclaimer, the term of this patent is extended or adjusted under 35 U.S.C. 154(b) by 1208 days.

(21) Appl. No.: 10/337,316

(22) Filed: Jan. 7, 2003

(65) Prior Publication Data
US 2003/0131101 A1    Jul. 10, 2003

(30) Foreign Application Priority Data
Jan. 9, 2002    (KR)    ............ 10-2002-0001253

(51) Int. Cl.
*G06F 15/173* (2006.01)
(52) U.S. Cl. .................................................. 709/224
(58) Field of Classification Search ............. 709/224, 709/223; 710/301, 302, 304
See application file for complete search history.

(56) References Cited

U.S. PATENT DOCUMENTS

| | | | | |
|---|---|---|---|---|
| 3,225,334 A | * | 12/1965 | Fields et al. ............... 710/1 |
| 5,815,668 A | * | 9/1998 | Hashimoto ................ 709/238 |
| 6,160,796 A | * | 12/2000 | Zou ........................... 370/257 |
| 6,405,247 B1 | * | 6/2002 | Lawande et al. ........... 709/221 |
| 6,405,270 B1 | * | 6/2002 | Chen ......................... 710/104 |
| 6,618,764 B1 | * | 9/2003 | Shteyn ...................... 709/249 |
| 7,061,895 B1 | * | 6/2006 | Habetha .................... 370/338 |
| 2002/0011923 A1 | * | 1/2002 | Cunningham et al. ... 340/310.01 |
| 2003/0074088 A1 | * | 4/2003 | Gonzales et al. ............ 700/19 |

FOREIGN PATENT DOCUMENTS

WO    WO 99/55071 A2    10/1999

\* cited by examiner

*Primary Examiner*—Andrew Caldwell
*Assistant Examiner*—Bradford F Fritz
(74) *Attorney, Agent, or Firm*—Birch, Stewart, Kolasch & Birch, LLP

(57) ABSTRACT

A method for deciding a network manager (NM) in a home network, including the steps of comparing a priority of a current NM and a priority of a new NM when the new NM is plugged-in a home network which is controlled by the current NM and deciding a NM having a higher priority as the NM of the home network between the current NM and the new NM, can smoothly control and manage the home network by deciding a NM having a higher priority as the NM for centralized-controlling the home network.

12 Claims, 5 Drawing Sheets

METHOD FOR DECIDING NETWORK MANAGER IN HOME NETWORK

BACKGROUND OF THE INVENTION

1. Field of the Invention

The present invention relates to a home network and particularly, to a method for deciding a network manager in a home network which can smoothly control and manage a home network.

2. Description of the Background Art

Generally, a home network means a technique which enables remote controlling by connecting all electric/electronic appliances in a house into a system. The home network will be described with reference to FIG. 1.

FIG. 1 is a view showing a state that home electronics are connected to a conventional home network. The home network includes an Audio/Video (A/V) network, PC network and living network which are connected with home electronics.

The AN network is connected with home electronics which send/receive audio and video signals, such as a digital television 31, digital VCR 32 and a digital camcorder 33. The PC network is connected with products related with computer operations, such as a PC 41, picture phone 42, DVD 43 and the like. The living network is connected with home electronics, such as a refrigerator 51, air conditioner 52 and washing machine 53. For instance, the refrigerator 51 searches a method for cooling each food without using the computer 41, and can download the method. The washing machine 53 can be driven by a user and when the user comes back home after work, the washing machine 53 can be controlled to end its operation. Various protocols for controlling a home network are developed so that control and traffic of home electronics which are connected to the home network can be smoothly performed.

The living network control protocol (hereinafter, as LnCP) which is one of protocols for controlling the home network enables high-speed internet communication in a normal home using a power line network, and enables home networking through the power line network.

However, conventionally, as the home electronics are individually controlled through an internet network in a currently developed home networking protocol, a centralized controller, that is a network manager (hereinafter, as NM) of the home networking for controlling operations of each home electronics to be smoothly performed encompassing setting of operational order through the internet network, giving addresses, and setting of house codes which are connected to the internet network has not developed yet. Here, the NM is also called as a configuration manager (hereinafter, as CM) or a network configuration manager.

Also, conventionally, a protocol for performing a function of a central controller by giving a NM to home electronics of the home network has not actualized yet. In case the NM can be given to a plurality of home electronics and there is no protocol for controlling the NM, the NM is given to each home electronics in the home network, and accordingly, a plurality of NMs become to exist. If there exist a plurality of NMs in the home network, signals which are duplicated and controlled collide with each other, or confuse the home network when performing address allocation and managing which are unique characteristic of the NM, setting of the house code and scheduling of the operation of the respective home electronics.

SUMMARY OF THE INVENTION

Therefore, an object of the present invention is to provide a method for deciding a network manager in a home network, capable of having respective home electronics which are connected to the home network function as central controllers, giving priority in an order of a product group level, product model level and a connection time level of an identical product models in case there exist a plurality of network managers in the home network, and deciding a network manager having the higher priority as the network manager of the home network.

To achieve these and other advantages and in accordance with the purpose of the present invention, as embodied and broadly described herein, there is provided a method for deciding a network manager in a home network, including the steps of comparing a priority of a current network manager and a priority of a new network manager when the new network manager is plugged in a home network which is controlled by the current network manager; and deciding a network manager having a higher priority as the network manager of the home network between the current network manager and the new network manager.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiment of the method for deciding the network manager in the home network, capable of smoothly controlling and managing the home network will be described in detail with reference to FIGS. 2 to 5, by comparing priorities of a current network manager (NM) and a new NM when the new NM is plugged in the home network which is centralized-controlled by the current NM, and deciding a NM having a higher priority as the NM of the home network between the current and new NMs.

Figure 1:
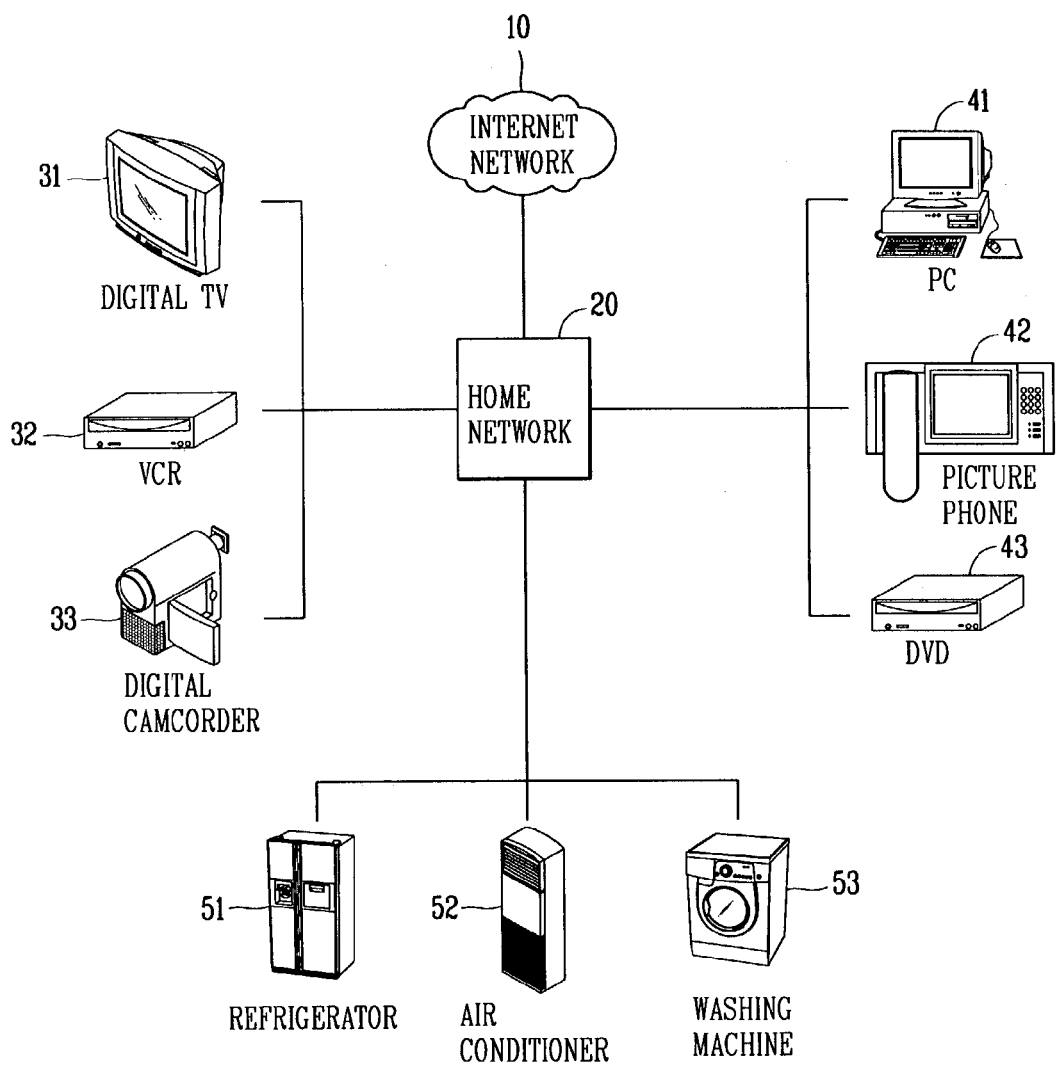
FIG. 1 is a view showing a state that home electronics are connected to a conventional home network.
Figure 2:
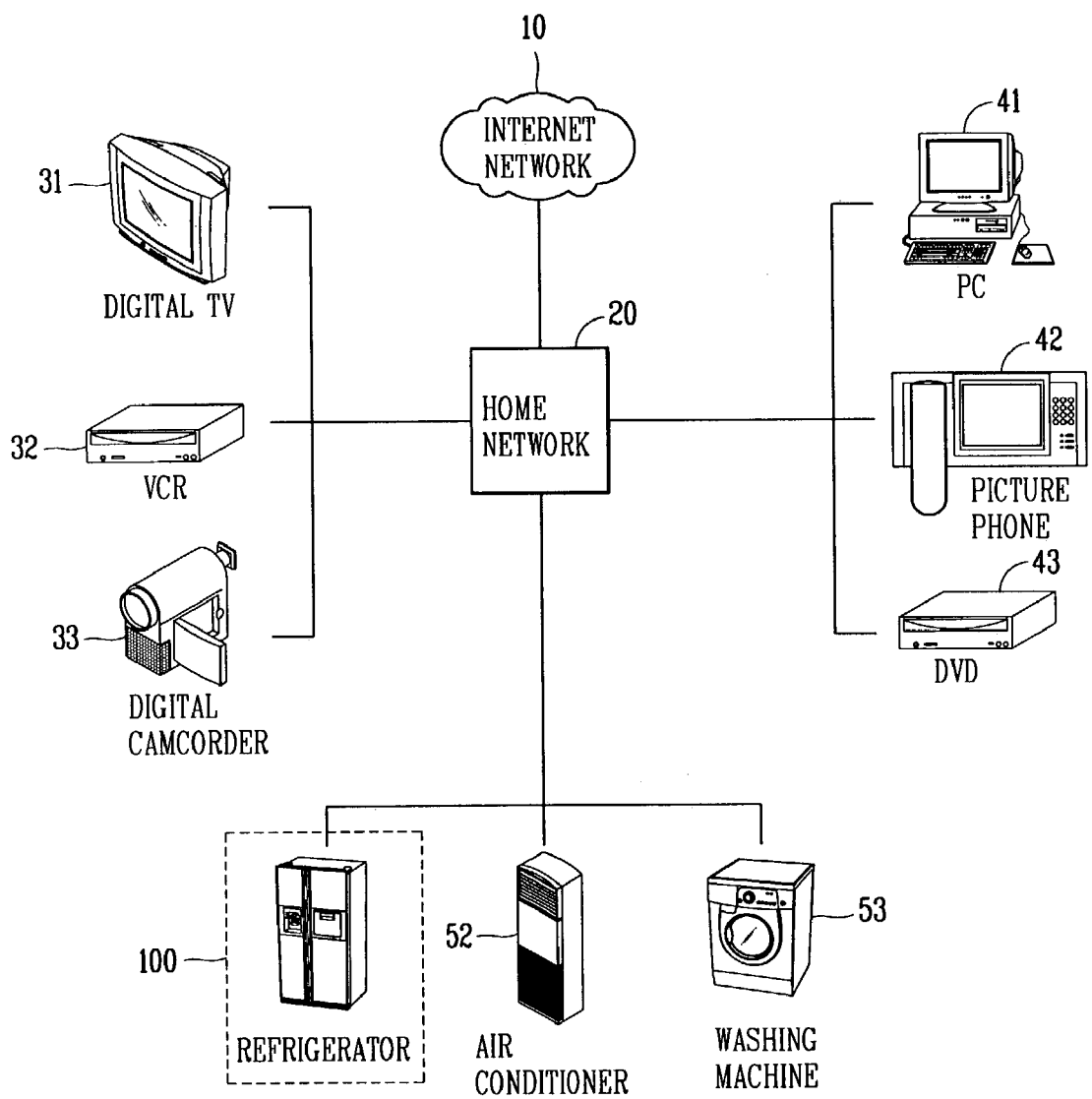
FIG. 2 is a view showing a state that a network manager is given to a refrigerator among a plurality of home electronics which are connected to a home network in accordance with the present invention.

FIG. 2 is a view showing a state that a NM is given to a refrigerator among a plurality of home electronics which are connected to a home network in accordance with the present invention. That is, the refrigerator to which the NM is given performs functions as a central controller in the home network. Also, the network manager can be given to any product as well as to a refrigerator. Here, the present invention decides a NM having the higher priority by comparing the priorities of a plurality of NMs existing in the home network, and performs centralized controlling of the home network with the decided NM. That is, the decided NM performs functions as a centralized controller. Hereinafter, description on identical components (reference numerals 10, 20, 31~33, 41~43 and 52~53) will be omitted, and the functions of the network manager in accordance with the present invention will be described in detail.

Firstly, the NM in accordance with the present invention sets a specific house code so that a home network of a home can be connected to an internet network, performs plug-in, such as on/off of the power source and the like so that each product which is based on the home network can communicate through the internet, gives an address to each product, and performs response function to packets which are communicated to each product. Also, the network manager in accordance with the present invention in accordance with the present invention performs resetting of a setting mode of the home network, performs a schedule setting function for controlling each product, and performs an operation managing function which periodically operates each product on the basis of the home network.

For instance, the refrigerator to which the NM is given is connected to the internet network by setting the house code of the home network, and the respective home electronics of the home network are connected to the internet network 10 through a gateway 20 of the home network. Also, the refrigerator to which the network manager is given can smoothly perform transmission/reception of transmission packets, data, audio signals and video signals of the respective home electronics which are connected to the home network through the internet network 10. If the new NM which is newly given to the refrigerator 53 is plugged in the home network which is centralized-controlled by the NM which is given to the refrigerator 51, a NM having a higher priority is decided as the NM of the home network by comparing the priorities of the NMs which are given to the refrigerator 51 and washing machine 53. The NM of the home network performs centralized-control of the home network.

The priority is decided by comparing group levels and models of products to which the NMs are given and connection time levels of the identical product models in order. For instance, in case the group level to which the product belongs has the first priority, the product model level has the second priority and the connection time level of the product models has the third priority.

The group level is divided into group levels of home server/home gateway group, PC products group, home electronics group and A/V products group, and by the priority of the group level, the network manager is decided. For instance, under the condition that a NM is given to an air conditioner which belongs to the home electronics group is given to the home network in which a protocol having a lower priority of the product group level according to the home server/home gateway group, PC products group in order, home electronics group and A/V products group and is operated, in case a PC which belongs to the PC products group to which a NM is newly given is plugged in, the group levels of the air conditioner and the PC are compared and accordingly the priority is decided. That is, since the PC has a higher priority of the product group level than the air conditioner, the network manager which is given to the PC performs centralized controlling of the home network.

On the other hand, in case the group levels of the product are identical, the NM of the home network is decided by giving a higher priority according to product model levels and the connection time levels of the identical product models in order. In case of the home electronics group, a higher priority of the product model levels can be given according to a digital camcorder, digital VCR and digital TV in an identical product group level in order. Also, in case the models of the products are identical, the priority is decided according to the connection time level of the identical model products. That is, the priority can be given according to the amount of time that the products are connected to the home network.

Figure 3:
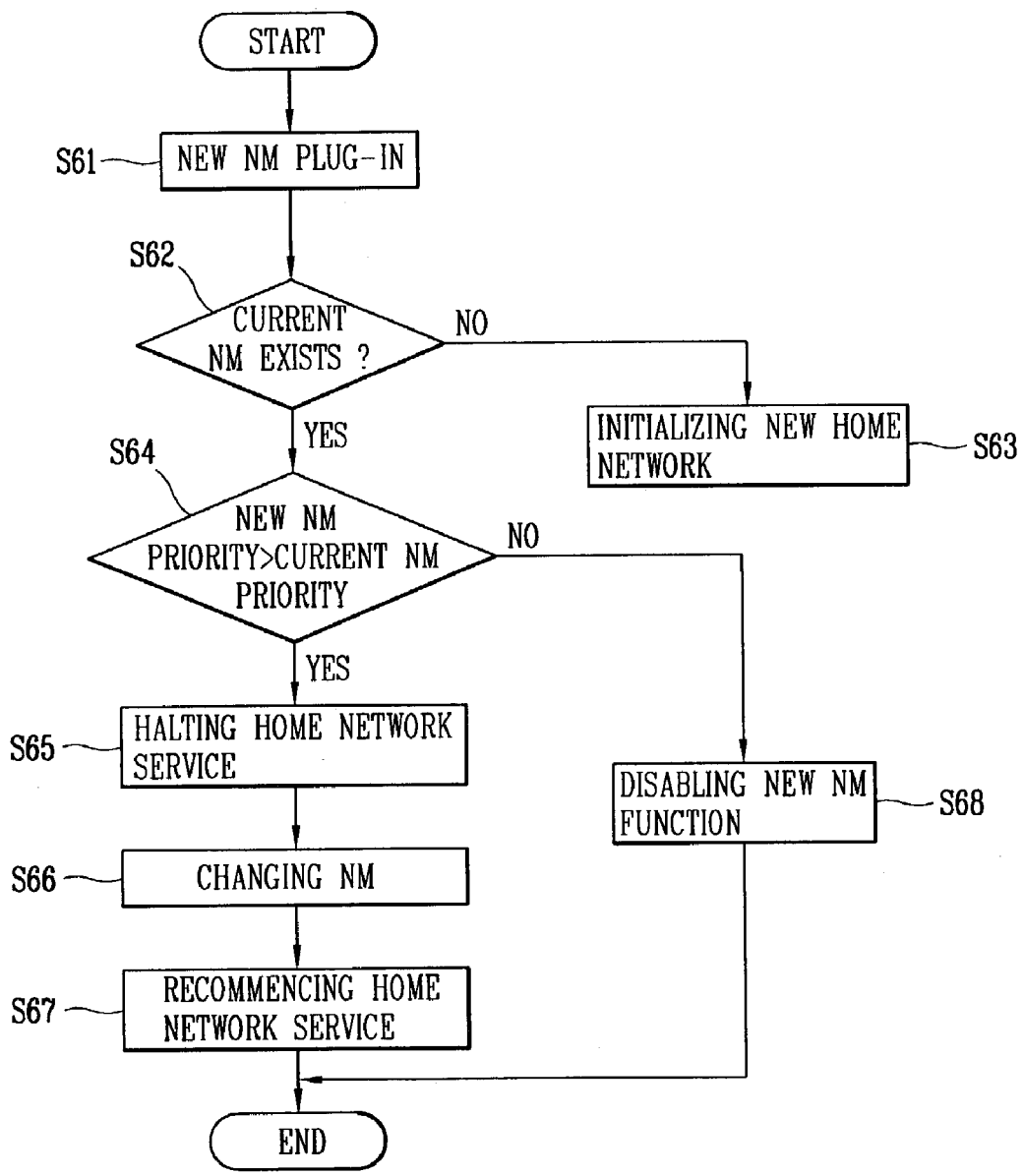
FIG. 3 is a flow chart showing a method for deciding a network manager in a home network in accordance with the present invention.

FIG. 3 is a flow chart showing the method for deciding the network manager in the home network in accordance with the present invention.

Firstly, when a new network manager is plugged in the home network (S11), it is searched whether the current NM exists in the home network (S12).

In case the current NM exists in the home network, the priorities of the new NM and the current NM are compared (S14).

In case the priority of the new NM is higher than that of the current NM, the service of the home network is temporarily stopped (S15).

Then, after temporarily halting the home network, the new NM is decided as the NM of the home network so that the home network which is centralized-controlled by the current NM can be centralized-controlled by the new NM (S16), and the home network service is recommenced (S17).

On the other hand, when the current NM does not exist in the home network, the home network is operated by the new NM by initializing the home network (S13).

In case the priority of the new NM is lower than or same as that of the current NM, the function of the new NM is disabled (S18).

Figure 4:
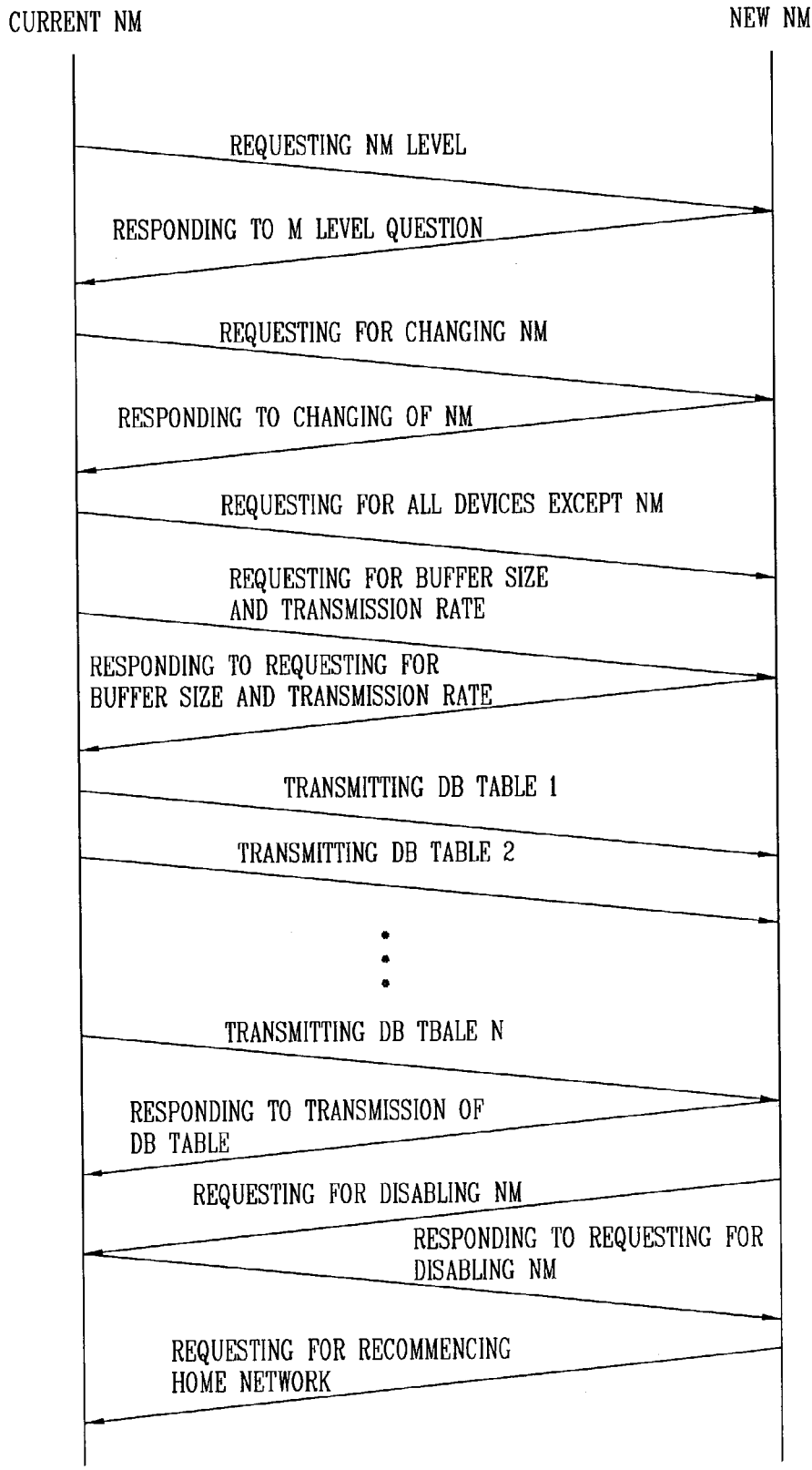
FIG. 4 is a view showing a transmitting/receiving process of packets by the new and current network managers in case a priority of the current network manager is lower than that of the new network manager in the home network in accordance with an embodiment of the present invention.

FIG. 4 is a view showing a transmitting/receiving process of packets by the new and current network managers in case the priority of the current network manager is lower than that of the new network manager in the home network in accordance with an embodiment of the present invention.

Firstly, when the new NM is plugged in the home network which is centralized-controlled by the current NM, the current NM transmits a requesting packet asking the new NM the level of the NM ("ASK NM Level" command code). The NM level is related to priorities which are given in order of group level and model level of products to which the NM is given, and connection time level of identical models. Here, the "ASK NM Level" is a command code asked by the current NM to check the priority of the new NM. That is, the new NM transmits its product group level, product model level and connection time level between the products of the identical models and the home network to the current NM.

The new NM which received the requesting packets asking the network manager level transmits response packets which includes its NM level to the current NM.

The current NM which received the NM level of the new NM compares the priority of the new NM and its priority, and if the priority of the new NM is higher than its priority, the home network transmits packets for requesting changing of the NM ("CHANGE CM" command code) to the new NM. Here, the "CHANGE CM" notifies the new NM of its product group level, product model level and connection time level of identical product levels, and is a command code for deciding the new NM as the NM of LnCP network. Also, the decided network manager becomes a network manager for centralized-controlling the home network.

The new network manager transmits confirm packets that the requesting packet for changing the NM was received to the current NM.

Then, the network manager transmits packets for requesting ending of all devices in the home network except the NM (here, if the protocol of the home network is LnCP, "HALT LnCP" command code) to the new NM. At this time, the current NM transmits packets for asking the new NM buffer sizes and transmission rates of the new NM to transmit a database table which can perform NM functions. Here, the "HALT LnCP" is a command code for halting the LnCP service to maintain stability and synchronization of the LnCP when the NM is changed in the LnCP network.

The new NM transmits packets indicating its buffer size and transmission rate to the current NM. The current NM which received the packet about the buffer size and transmission rate of the new NM transmits a plurality of database tables ($1, 2, \ldots, N$) ("SEND DB Table" command code) to the new network manager. Here, the "Send DB Table" is a command code which is used in case the NM and database tables must be exchanged each other, and the database tables related with the LnCP network are transmitted to the new NM so that the current NM becomes the NM of the home network in a decision algorithm. Accordingly, the new NM can rapidly centralized-control the home network (LnCP network).

The new NM receives all of a plurality of database tables ($1, 2, \ldots, N$) from the current NM, and transmits confirm packets that reception of the database tables was successfully performed to the current NM. At this time, the new network manager transmits packets for disabling functions of the current NM ("UNABLE CM" command code) to the current NM. Here, the "UNABLE CM" is a command code which is used for removing the function of the NM.

Then, when the current NM transmits confirm packets that the packets for disabling the functions of the network manager were successfully received to the new NM, the new NM transmits packets for recommencing the home network (here, if the protocol of the home network is LnCP, "RESUME LnCP" command code) to the current NM. Here, the "RESUME LnCP" is a command code for continuing network services of the LnCP network after changing the NM. Therefore, the home network is centralized-controlled by the new NM.

On the other hand, in case the NM was removed by network errors, the present invention can solve the problem by setting a command code of "CHECK NM" for checking whether there exists a NM in the LnCP network.

Figure 5:
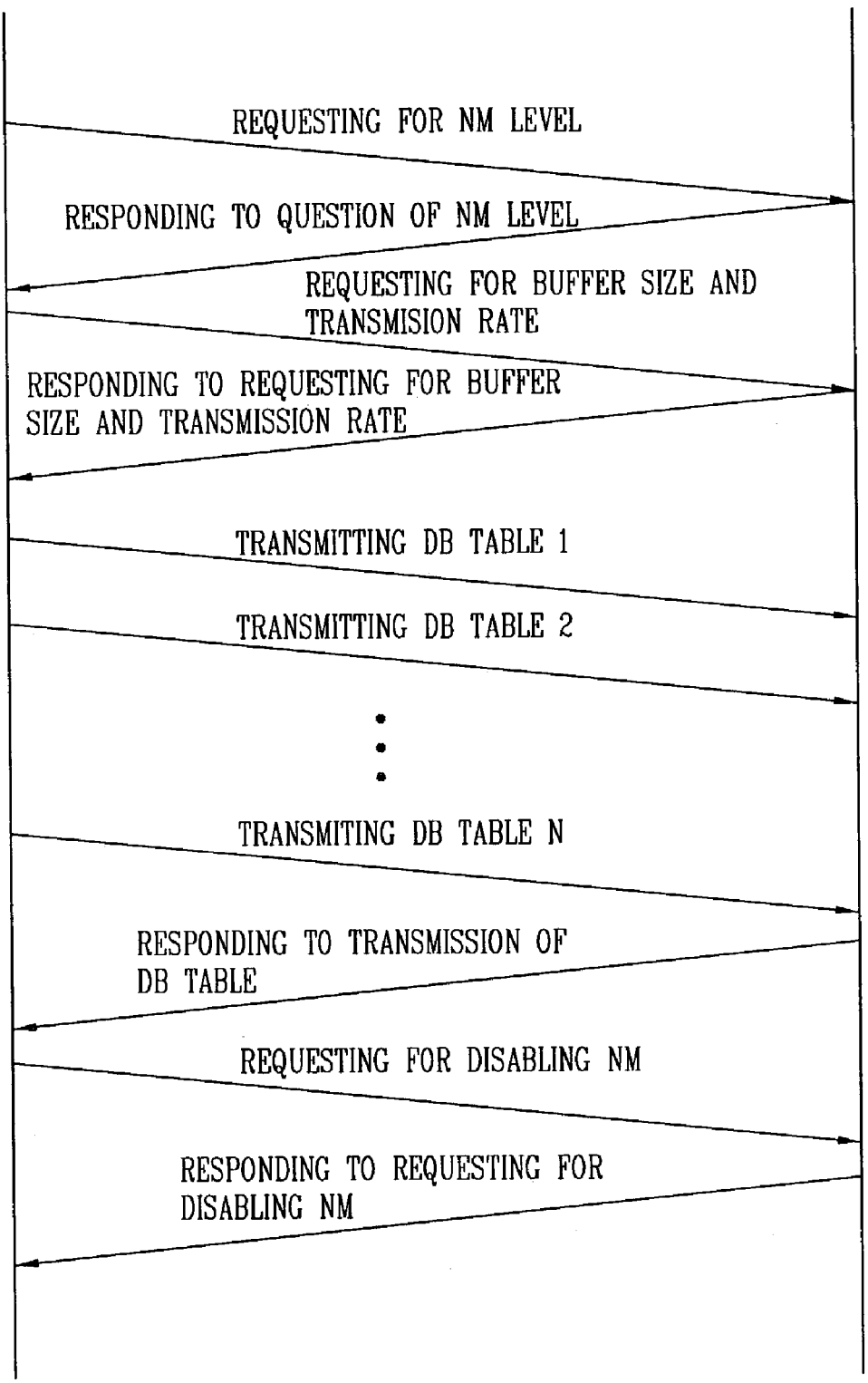
FIG. 5 is a view showing a transmitting/receiving process of packets by the new and current network managers in case a priority of the current network manager is higher than that of the new network manager in the home network in accordance with the embodiment of the present invention.

FIG. 5 is a view showing a transmitting/receiving process of packets by the new and current network managers in case the priority of the current network manager is higher than that of the new network manager in the home network in accordance with the embodiment of the present invention.

Firstly, when the new NM is plugged in the home network which is centralized-controlled by the current NM, the current NM transmits requesting packets for asking the new NM the NM level ("ASK NM Level" command code).

The new NM which received the requesting packet asking the NM level transmits response packets including its NM level to the current NM.

The current NM which received the NM level of the current NM can perform functions as a NM of the home network to perform stable operation of the NM in the home network, in case there occur problems in performing the operation of its NM when its NM level is higher than that of the new NM by comparing its NM level and NM level of the new NM. Therefore, the current NM transmits packets which ask a buffer size and transmission rate of the new NM for transmitting the database table so that the new NM can perform functions as the NM of the home network to the new NM.

The new NM transmits packets indicating its the buffer size and transmission rate to the current NM. The current NM which received the packets about the buffer size and transmission rate of the new NM transmits a plurality of database tables ($1, 2, \ldots, N$) ("SEND DB Table" command code) to the new network manager.

The new NM transmits packets which notify its buffer size and transmission rate to the current NM. The current NM which received the packet about the buffer size and transmission rate transmits the plurality of database tables ($1, 2, \ldots, N$) ("SEND DB Table" command code) to the new NM.

After the new NM receives all of the plurality of database tables ($1, 2, \ldots, N$), it transmits confirm packets that reception of the database tables were successfully performed to the current NM.

After the current NM receives the confirm packet, it transmits packets for disabling the functions of the NM ("UNABLE NM" command code) to the new NM until there occur problems in performing its operation as the NM or the function of the NM is halted.

The new NM transmits confirm packets that the packets for disabling the function of the NM were received to the current NM.

Therefore, in the present invention, since the priority of the current NM is higher than that of the new NM in the home network, the home network is continuously operated by the current NM. At the same time, the current NM transmits the database table to the new NM and disables the functions of the new NM. Accordingly, the function of the NM in the home network can be performed by the new NM in case the function of the current NM is halted or there occur some problems.

Also, the method of deciding the NM in the home network in accordance with the present invention is not limited to be used in the LnCP protocol, but can be applied to any home network protocol including the LnCP.

As described above, in the present invention, the home network protocol is set so that respective home electronics which are connected to the home network can perform functions as a centralized controller, and in case there exist a plurality of NMs, a NM having a higher priority by giving a higher priority according to the product group level, product model level and connection time level of identical product models in order is decided as a NM for centralized-controlling the home network, thus to smoothly control and manage the home network.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for deciding a NM in a home network, comprising:
plugging a new network manager (NM) in a home network;
searching whether a current NM exists in the home network;
comparing a priority of the new NM and a priority of the current NM if the current NM exists;
halting the home network when the priority of the new NM is higher than that of the current NM;
deciding the new NM as a NM of the home network after halting the home network, a NM having a higher priority according to product group levels of the current NM and the new NW being decided as the NM of the home network; and
recommencing the home network service after the new NM is decided as the NM of the home network,
wherein the priority of only the current NM and the new NM is compared.

2. The method of claim 1, wherein if the product group levels of the current NM and the new NM are the same, the NM having a higher priority according to product model levels of the current NM and the new NM being decided as the NM of the home network in the step of deciding.

3. The method of claim 1, wherein the home network is operated by the new NM by initializing the home network when the current NM does not exist.

4. The method of claim 1, further comprising a step of:
disabling the function of the new NM in case the priority of the new NM is same as or lower than that of the current NM.

5. The method of claim 1, wherein the home network is a home network which is operated by a living network control protocol.

6. The method of claim 1, wherein the priority of the NM is given according to home server/home gateway group, PC products group and home electronics group in order.

7. The method of claim 2, wherein if the product model levels of the current NM and the new NM are the same, the NM having a higher priority according to connection time level of the current NM and the new NM being decided as the NM of the home network in the step of deciding.

8. A method for deciding a network manager (NM) in a home network, comprising:
transmitting a requesting packet that a current NM asks a network manager level is transmitted to the new NM when the new NM is plugged in the home network which is controlled by the current NM;
transmitting a response packet including the NM level of the new NM to the current NM by the new NM which received the requesting packet;
deciding a priority of the new NM by the current NM which received a NM level of the new NM;
transmitting a packet for requesting changing of the NM to the new NM by the home network when the priority of the new NM is higher than that of the current NM;
transmitting a packet for requesting ending of all devices except the current NM and new NM in the home network to all devices of the home network by the current NM;
transmitting a plurality of database tables to the new NM by the current NM;
transmitting a packet for halting functions of the current NM to the current NM by the new NM; and
transmitting a packet for recommencing the home network to all devices of the home network by the new NM,
wherein a NM having a higher priority is decided as the home NM by comparing the priorities which are given in advance according to product group levels of the current NM and the new NM, and
wherein the priority of only the current NM and the new NM is compared.

9. The method of claim 8, further comprising a step of:
transmitting the plurality of database tables to the new NM by the current NM so that the new NM can be operated as the home network, if the priority of the new NM is lower than that of the current NM and the current NM can not operate functions of the NM as there occurs a problem in the home network.

10. The method of claim 8, wherein if the product group levels of the current NM and the new NM are the same, the NM having a higher priority is decided as the home NM by comparing the priorities which are given in advance according to product model level of the current NM and the new NM.

11. The method of claim 8, wherein a protocol of the home network is a living network control protocol (LnCP).

12. The method of claim 10, wherein if the product model levels of the current NM and the new NM are the same, the NM having a higher priority according to connection time level of the current NM and the new NM being decided as the NM of the home network in the step of deciding.

* * * * *